Dec. 30, 1969   P. W. JOHNSTON   3,486,813
VISION TESTING DEVICE
Filed May 5, 1967   6 Sheets-Sheet 1
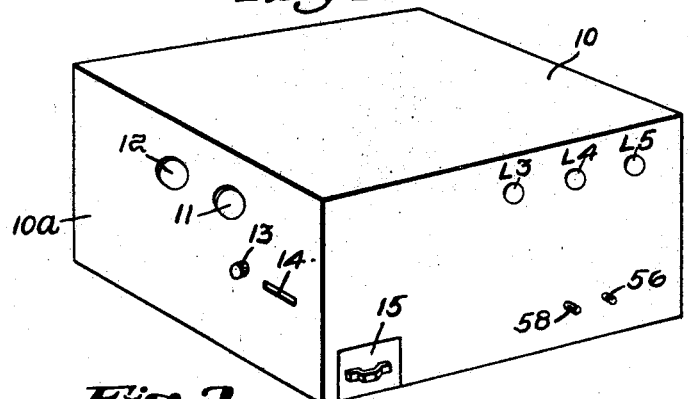
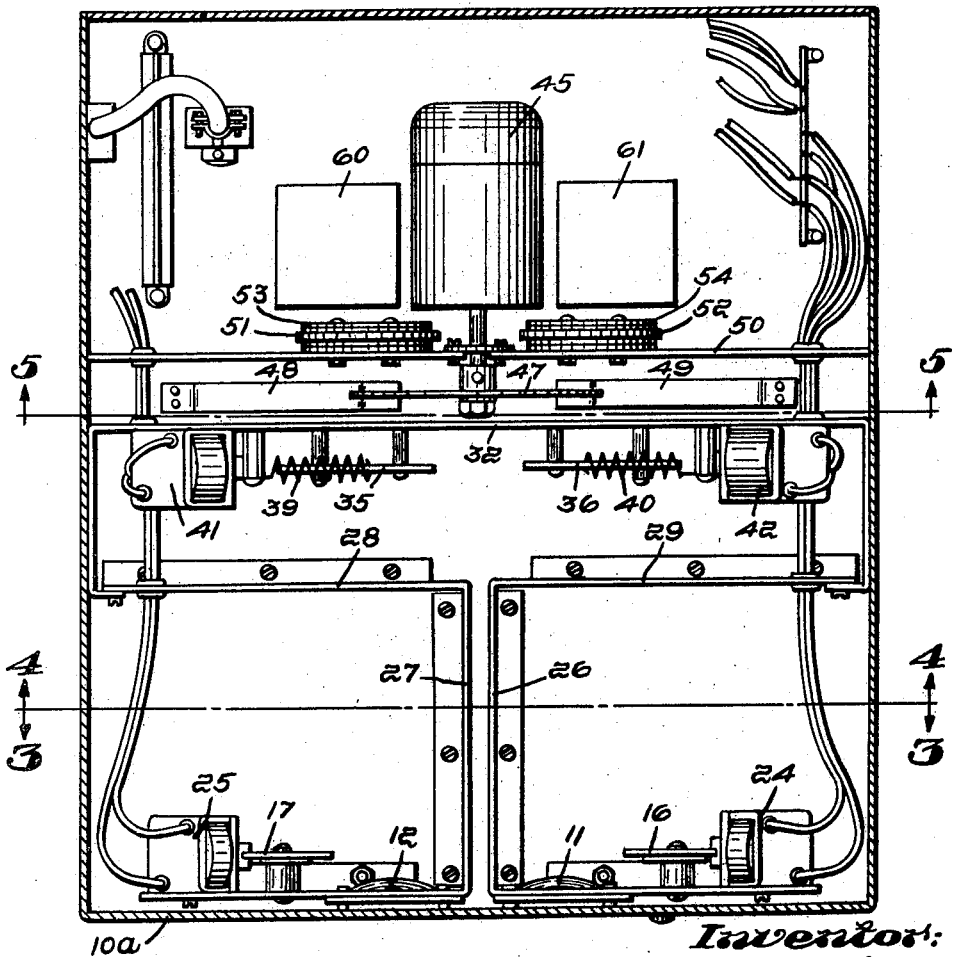
Inventor:
Philip W. Johnston,
by Arnold, Roylance, Kruger & Durkee
Attorneys

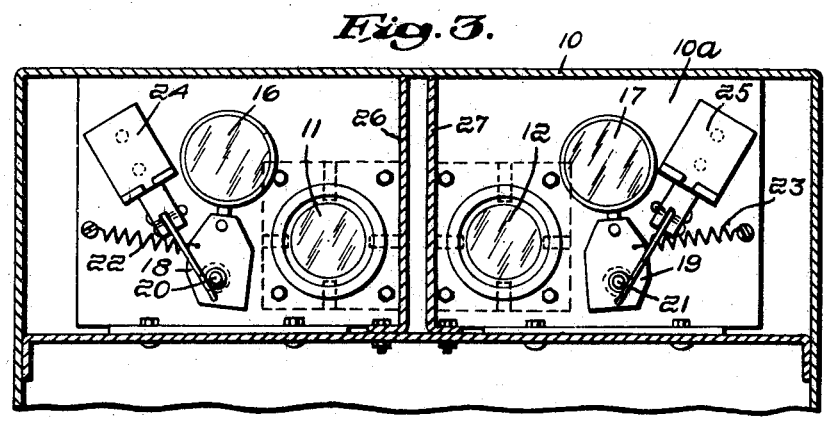
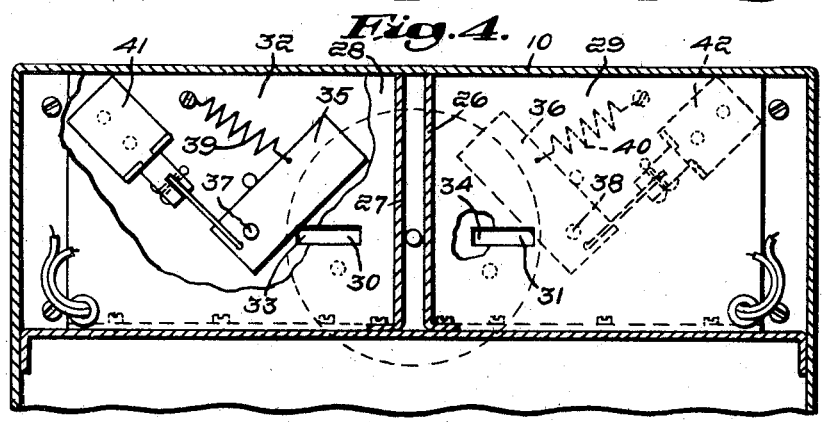
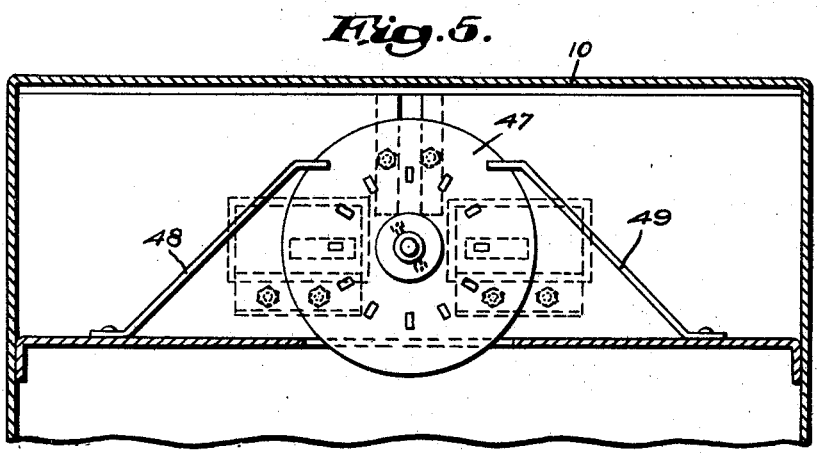

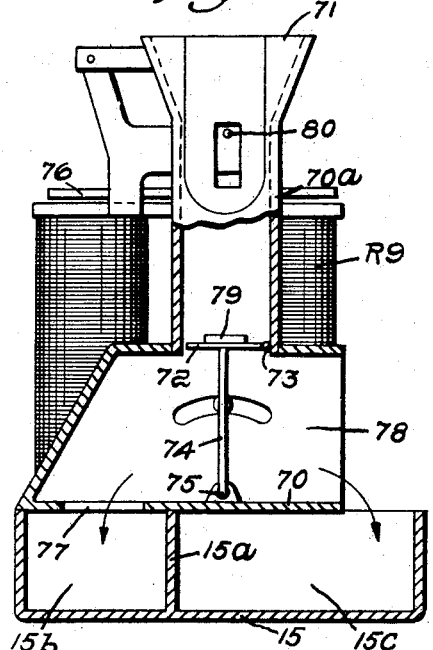
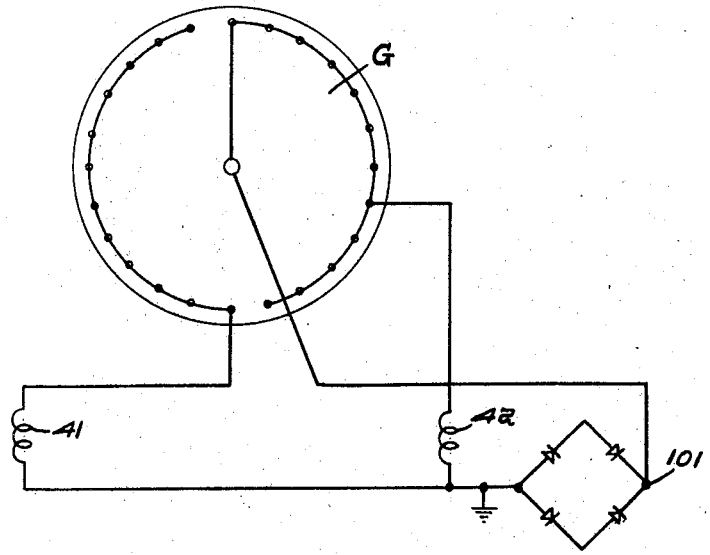

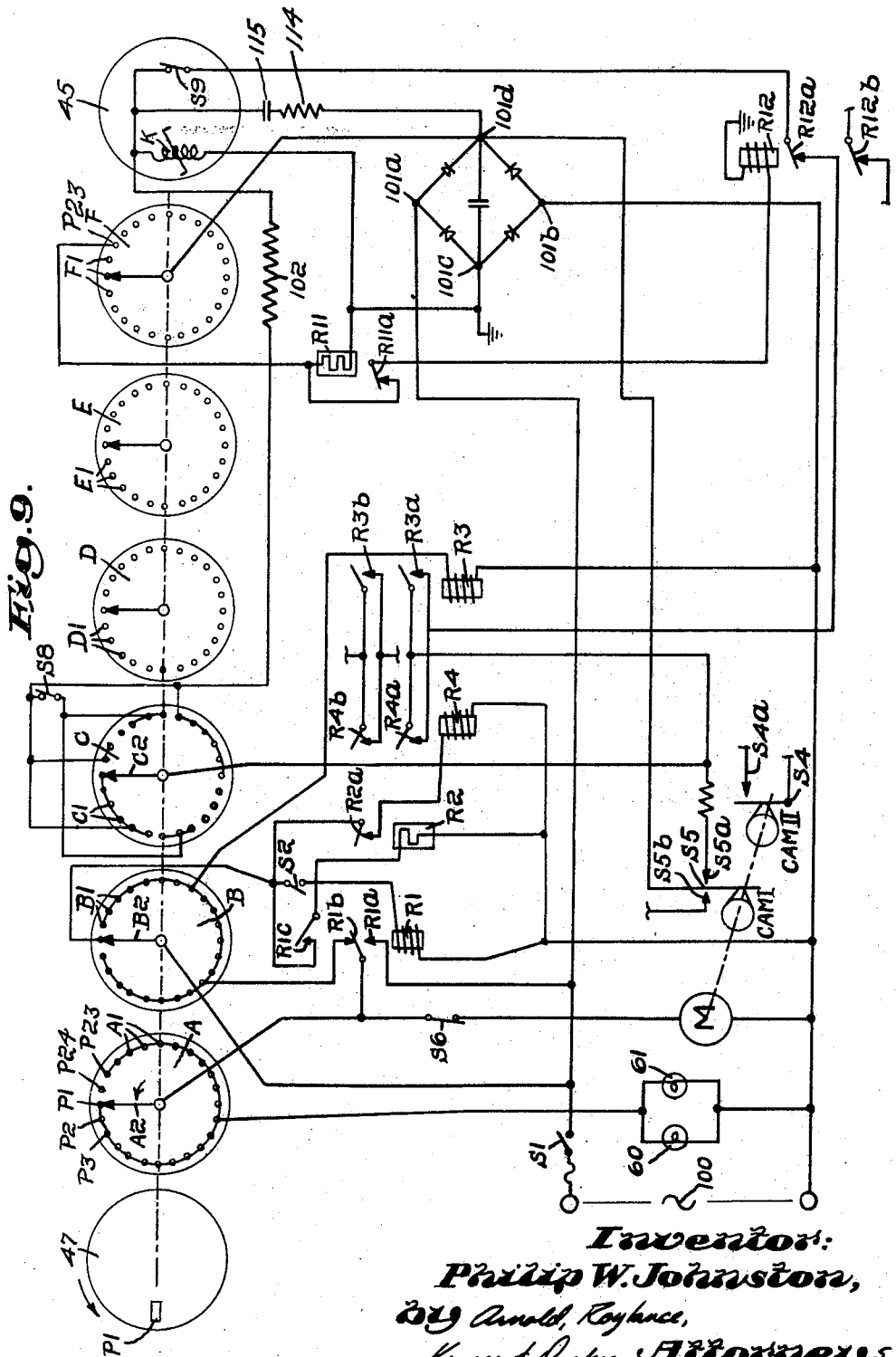

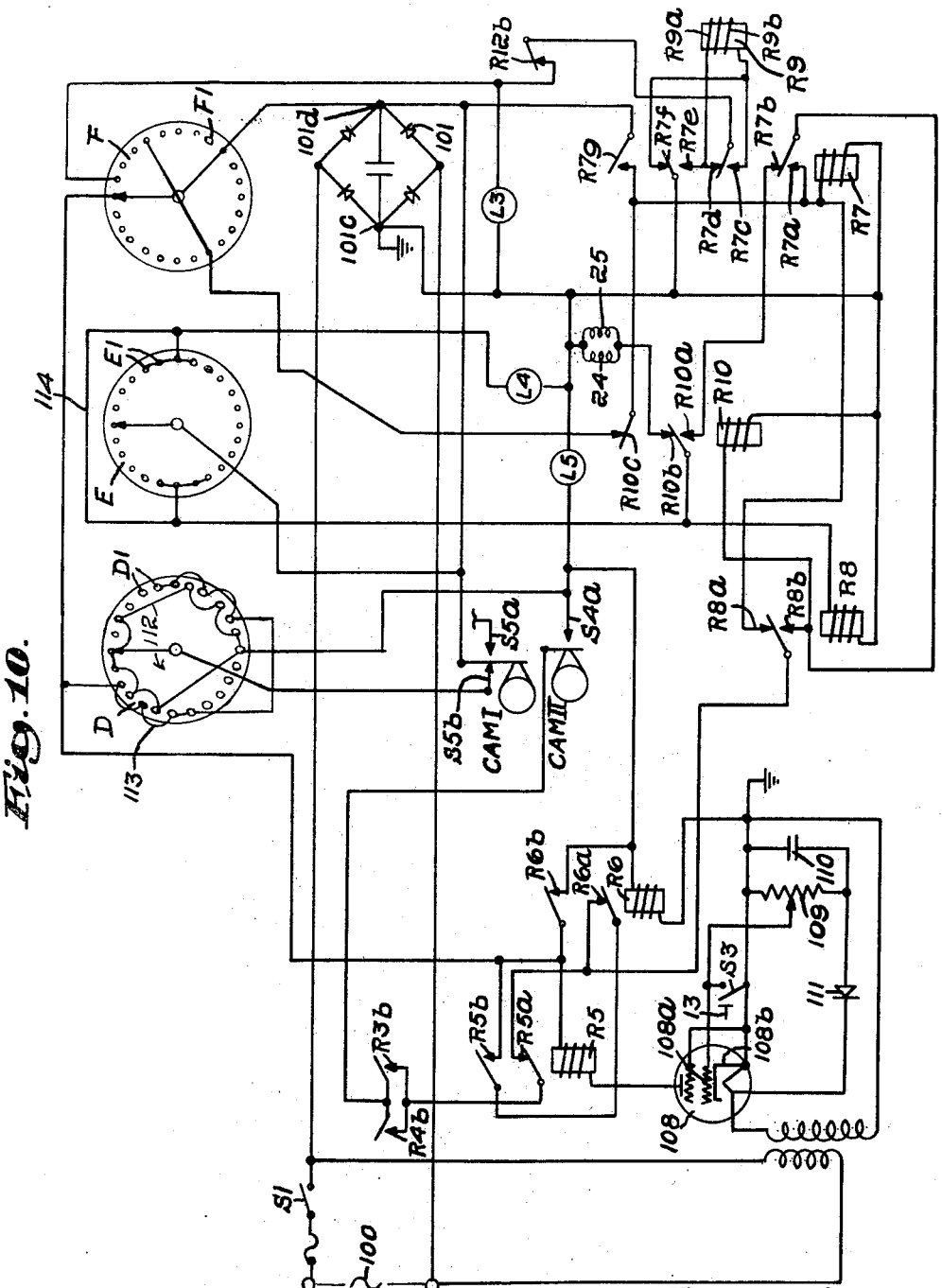

United States Patent Office 3,486,813
Patented Dec. 30, 1969

3,486,813
VISION TESTING DEVICE
Philip W. Johnston, Wellesley, Mass., assignor to Tracor, Inc., Austin, Tex., a corporation of Texas
Continuation-in-part of application Ser. No. 179,744, Mar. 14, 1962. This application May 5, 1967, Ser. No. 636,500
Int. Cl. A61b 3/02, 3/00
U.S. Cl. 351—17                                        15 Claims

ABSTRACT OF THE DISCLOSURE

A device for viewing a programmed sequence of displays through first and second fields of vision on a rotatable disk controlled by a motor, ratchet and timing device, the displays being a sequence of symbols assuming one of two possible orientations and of a size ascertainable by a person with normal vision. A movable lens arrangement is included for distorting the person's vision while viewing a short subsequence to test for farsightedness. Movable shutters alternately block each eye during the test. Symbols viewable by both eyes simultaneously appear superimposed to a person of normal muscle control. Response mechanism correlate the person's answer to each test in the sequence with the actual test condition so that either a satisfactory or an unsatisfactory response to the entire test will be indicated.

---

The present invention pertains to a testing device particularly well-suited for unmonitored operation by a person undergoing vision testing and providing a rapid indication of overall satisfactory vision. Generally, the device includes a box for viewing into and having, for example, a programmed sequence of displays (preferably presentable by a disk rotatably controlled by a motor, ratchet and timing device) for (1) presenting a sequence of symbols assuming one of two possible orientations and of a size ascertainable by a person with normal vision, (2) a movable lens arrangement for distorting the person's vision while viewing a short sequence of symbols (to test for farsightedness), (3) movable shutters for alternately blocking vision in each eye and (4) symbols viewable by both eyes simultaneously that appear superimposed to a person having normal muscle control. Upon observing each display, the person presses or does not press a button to indicate if the display is oriented in a first direction, viewable at all and if the last pair of symbols appear superimposed. Each answer influences the operation of a group of relays, a thyratron tube, etc., which control an eventual "pass" or "fail" register such that if there is an unsatisfactory answer, upon completion of the test, a token is deposited in a "fail" compartment, otherwise in a "pass" compartment.

The instant continuation-in-part application claims priority based upon the invention disclosed in application Ser. No. 179,744 entitled Vision Testing Device filed Mar. 14, 1962 in the name of Philip W. Johnston as inventor, now abandoned.

This invention relates to devices for testing a person's vision, and more particularly to means for testing groups of people to determine which individuals have normal or adequate vision and which do not.

The customary method of testing vision is to display a card bearing a series of letters of symbols, at a certain distance from the individual being tested, and ask him to read the symbols. This method requires constant attention of another person, who administers the test and observes in each case whether the individual reads the symbols correctly, and can read symbols of a certain fineness which has been established as the standard at the prescribed distance for normal or adequate vision. If the person taking the test is a young child or illiterate, the examiner may show him cards with a single symbol and ask the subject which way it is turned. In any case, such tests require constant attention of an examiner.

There are many situations in which it is desirable to test or "screen" a group of people to determine whether the vision of each individual in the group does or does not meet a particular standard, for example to check the vision of individuals applying for drivers licenses, to select among recruits in the armed services those whose vision meets the requirements for training in various skills, or to determine which individuals in a group of school children have faulty enough vision to require further testing and correction.

The principal object of this invention is to provide for this purpose a testing device which may be operated by a person whose vision is being tested, without supervision by an examiner, which will automatically record the test results in each case and indicate whether or not the individual's vision is adequate to meet a certain standard, and which does not necessarily depend on the individual's reading ability or fluency. Another object is to provide a device which is reliable and tamperproof, which is simple to operate, and which may be used in any convenient location.

The device consists in general of an optical system contained in a housing and arranged to display automatically a sequence of sets of symbols, an indicating system by means of which the person taking the test may indicate whether the symbols in a set are the same or different, and a recording system which records, at the end of the test, an indication as to whether or not the individual has given the correct response to each set of symbols displayed. In the particular embodiment here described, pairs of symbols are imprinted on a disk which is automatically rotated at intervals, and are viewed through an optical system which permits a sequence of symbols to be viewed first by one eye and then by the other, and by both at certain points. The instrument is put into operation by dropping a token or special coin into a slot in the housing, and the indicating system includes a push button which the person taking the test is instructed to press if the symbols in a pair appear the same, and not to press if they appear different. If he responds correctly in all cases, the coin drops into a "pass" compartment in a drawer at the end of the test run, and if he makes an error, the coin drops into a "fail" compartment in the drawer. The coins are numbered and the corresponding names of individuals recorded, so that after the entire group has been tested, a supervisor may readily determine which individuals have passed the test and which have failed.

Other objects, advantages, and novel features of the invention will be apparent from the following detailed description.

In the drawings illustrating the invention:

FIG. 1 is a perspective view of the exterior of a vision testing device constructed according to the invention;

FIG. 2 is an enlarged horizontal cross-section of the device in the region of the optical projection system;

FIG. 3 is a fragmentary cross-section taken along line 3—3 of FIG. 2;

FIG. 4 is a fragmentary cross-section taken along line 4—4 of FIG. 2;

FIG. 5 is a fragmentary cross-section taken along line 5—5 of FIG. 2;

FIG. 8 is a schematic cross-section of the mechanism which directs the coin to the "pass" or "fail" compartment;

FIGS. 9 and 10 are electrical schematic diagrams illustrating the control circuits of the device; and FIG. 11 is an electrical schematic diagram of a circuit for controlling masks which may block off the view of either eye.

Figure 6:
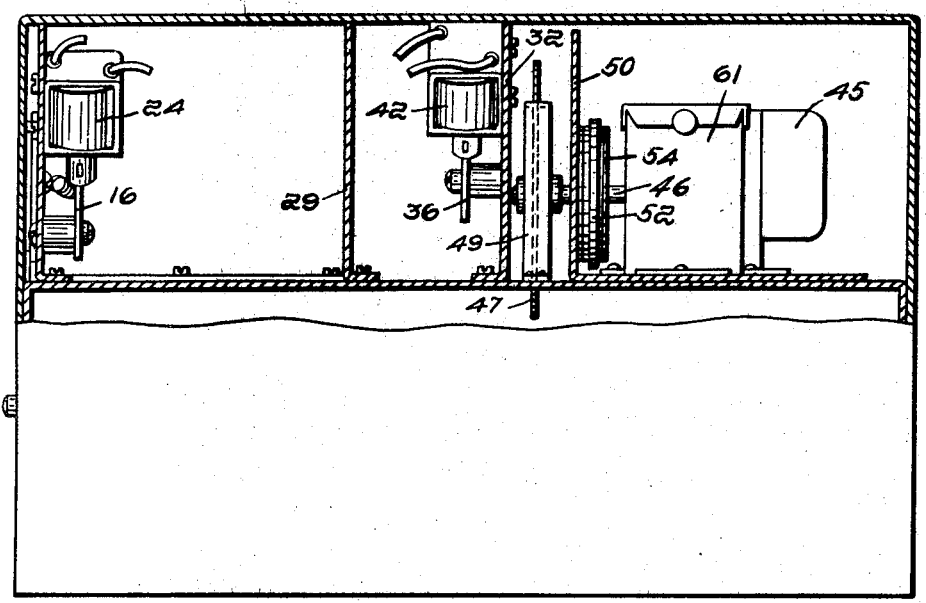
FIG. 6 is a side elevation of the device, the upper portion of the casing being shown cut away.

The working parts of the device are mounted in a closed housing 10, having a front panel 10a in which are mounted a pair of viewing lenses 11 and 12, and a push button 13 by which the person being tested indicates, whether the symbols in a pair appear the same or different. A slot 14 into which the coins or tokens are inserted is also provided in the front panel. The housing has a removable drawer 15 in one side for collecting the coins in two compartments, as will be later described.

As shown in FIG. 3, an additional pair of lenses 16 and 17 are disposed immediately behind panel 10a. The lenses are mounted on brackets 18 and 19 which are rotatable about pivots 20 anad 21, respectively. The brackets are normally held by springs 22 and 23, respectively, in such a position as to keep the lenses 16 and 17 out of the line of the viewer's vision. A pair of plunger type solenoids 24 and 25 are connected to the brackets and, when energized, will rotate the brackets to bring lenses 16 and 17 into alignment with lenses 11 and 12, respectively, to change the effective viewing distance.

A pair of partitions 26 and 27 extend rearward from panel 10a and join transverse partitions 28 and 29 which have apertures 30 and 31 through which images may be projected, to each of lenses 11 and 12 separately. Spaced somewhat behind partitions 28 and 29 is a wall 32 having apertures 33 and 34 aligned with apertures 30 and 31, respectively. Mounted on wall 32 are a pair of masks 35 and 36, which are rotatable about pivots 37 and 38 and are normally held by springs 39 and 40 in a position to uncover the apertures 33 and 34. A pair of plunger type solenoids 41 and 42 are connected to the masks and, when energized, will rotate the masks into a position to cover the respective apertures 33 and 34.

Behind wall 32 is disposed a rotary step switch 45 having a shaft 46 on which a transparent disk 47, bearing the symbols to be viewed, is mounted. The disk runs between two slotted edge guides 48 and 49 which engage its rim and maintain its planar position accurately. Between disk 47 and the rotary step switch is another wall 50 having two openings across which a pair of ground glass screens 51 and 52 are supported on brackets 53 and 54. Behind the screens are lamps 60 and 61 for illuminating the symbols on disk 47.

Figure 7:
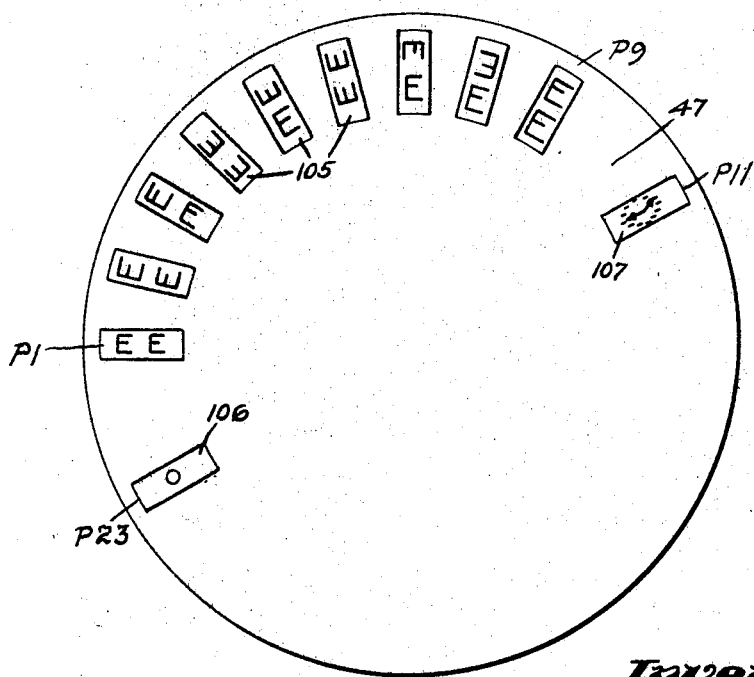
FIG. 7 is a detail front view of the disk on which the pairs of symbols are printed.

The lenses 11 and 12 are 5 diopter spherical lenses, and disk 47 is mounted at such a distance that the symbols printed on it lie in the focal plane of the lenses. A typical set of symbols is shown in FIG. 7, and their sequence will be explained in connection with the test procedure. The symbols here shown consist of pairs of letters E. In some cases the two letters point in the same direction and in other cases in different directions. It is understood that other types of symbols may be used as long as they are arranged so that two in each pair appear either the same or different and also that sets of more than two symbols arranged to require either a "like" or "unlike" response may be used. The size and character of the symbols is also chosen according to the standard of visual acuity for which the device is designed to test. For example, the letter E, when viewed through the lenses 11 or 12, may correspond optically to the size of the same letter which, when viewed on a card of the usual type at the standard testing distance, would be distinguishable to a person having normal or 20—20 vision.

Mounted in the lower part of the housing adjacent to slot 14 is a coin changer, of a commercially available type ordinarily used in pay telephones to drop a coin into the collection compartment when a call is put through, or direct the coin to the coin return box if the call fails. This device is illustrated schematically in FIG. 8. A housing 70 has a tubular upward extension 70a terminating in a slot-shaped mouth 71 which is aligned with slot 14 to receive coins. A shutter 72 is mounted on a spring-loaded hinge 73 at the base of extension 70a and is held in horizontal position by a baffle 74 pivoted on hinge 75. Behind the housing is a polarized relay having a pair of coils R9 connected in series, and a tilting armature 76. The armature will tilt clockwise when DC current flows in one direction through coil R9 and counterclockwise when DC current flows in the opposite direction. Armature 76 is linked to baffle 74 and tilts the baffle in one direction or the other, allowing shutter 72 to drop. The housing has two openings 77 and 78. Depending on which way the baffle 74 is tilted, a coin 79 which has been dropped into the device will be directed through one or the other of the openings when the shutter drops. Drawer 15 is disposed below this device and has a partition 15a dividing the drawer into two compartments 15b and 15c, designated the "pass" compartment and one the "fail" compartment. The coin changer includes a switch designated S2 in the description of the electrical circuit, operated by an arm 80 which is engaged by a coin dropped into mouth 71 and remains in position to keep the switch S2 closed until R9 is energized and operates baffle 74 to discharge the coin. The construction of the relay and switch are not here shown in detail as coin changer devices of this type are well known in the art. An example is shown in U.S. Patent No. 2,026,983.

The components of the electrical system, except for the step switch 45 and solenoids 24, 25, 41 and 42, are mounted in any convenient manner in the lower part of the housing. The electrical system includes a drive circuit for the step switch, and a scoring circuit which energizes coil R9 at the end of a test in one direction or the other to deposit the coin in the "pass" or "fail" compartment of drawer 15.

Step switch drive circuit

The circuit for driving the step switch 45 is shown in FIG. 9. Power for energizing the AC portions of the circuit is derived from an AC source 100. A manual main switch S1 is provided for shutting down the entire machine. DC current is derived from a rectifier bridge, generally indicated by the numeral 101, having input junctions 101a and 101b, connected to source 100, and output junctions 101c and 101d. The step switch 45 is of a commercially available ratchet type having a ratchet designed to advance the switch one step at a time operated by a solenoid K, and an interrupter switch S9, connected in series with solenoid K which breaks the circuit to the solenoid at the end of each advance of the ratchet, allowing the ratchet to drop back, and then reclose.

The operation of the interrupter switch S9 causes the ratchet to recycle and continue to advance the step switch step by step as long as there is a live circuit S9. A resistance 102 is connected in the circuit of solenoid K at certain times, as will be later explained, in parallel with switch S9. When thus connected, resistance 102 is shunted by S9 while the latter is closed, so that the full current of the drive circuit is transmitted to solenoid K causing it to advance the ratchet. As soon as S9 opens, resistor 102 is in series with solenoid K and the solenoid current is reduced, but sufficient current still flows to hold the ratchet in advanced position. The result is that the step switch is advanced one step and held in that position until the drive circuit is interrupted. When resistor 102 is not connected, the step switch will be advanced by repeated operation of the ratchet until the drive circuit is broken.

Resistance 102 is of such a value that the current through solenoid K, when the circuit to S9 is open, as at the beginning of the test cycle, is not sufficient to advance the solenoid operated ratchet, although it is sufficient to hold the ratchet once it has been advanced.

A spark suppression network consisting of resistor 114 and condenser 115 is provided in the solenoid circuit. The step switch 45 has twenty-four positions and carries on its shaft six rotary wafer switches A, B, C, D, E and F as well as disk 47. Each of the wafer switches consists of a stationary wafer carrying twenty-four contacts A1, B1, C1, D1, E1, and F1, respectively, corresponding to the twenty-four switch positions, and a rotating arm A2, B2, C2, D2, E2, and F2, respectively, which engages each of the twenty-four wafer contacts in turn.

Wafer switches A, B and C control the step switch drive portion of the electrical system which includes a timer motor M, four relays R1, R2, R3, and R4, and the coin switch S2 which is closed by dropping a coin into slot 14. The motor M drives two cams designated "cam I" and "cam II," which, in certain positions, operate snap switches S5 and S4, respectively. For purposes of description the step switch positions will be designated P1, P2, P3, etc., in the order of engagement of the wafer contacts by the switch arms which rotate counter-clockwise with shaft 46, as here illustrated. In FIG. 9 the wafer arms are shown in position P1.

The operation of the drive circuit is as follows:

Switch S2 is closed by dropping a coin into slot 14 and remains closed through a complete cycle of the step switch. It will be noted that this switch is connected to a contact B1 in position P1 of wafer B. Closing of switch S2 completes a circuit from arm B2, which is connected to the AC line, through the coil of relay R1. This relay has two normally open contacts R1a and R1c and a normally closed contact R1b. Contact R1c serves only to by-pass switch S2 and carry some of the current load. The closing of contact R1a completes the circuit to motor M, and also through wafer A, which has its A1 contacts in positions P1 through P23 connected together, to lights 60 and 61 which illuminate disk 47. The timer motor M rotates cam I and cam II at a rate of approximately one revolution every four seconds. S5 has a normally open contact S5a which is closed for a short period by cam during every revolution.

The function of contact S5 is to close the circuit to solenoid K upon each revolution of the motor M and thus advance the step switch 45, but this does not occur at the beginning of the test cycle for the reasons about to be explained.

At the start of the test procedure, it is desirable to provide a certain delay so that the person taking the test may become adjusted to the viewing procedure. For this purpose a thermal time delay relay R2 is introduced. This relay is energized by closing S2 but does not operate to close its normally open contact R2a until the end of the delay period for which it is designed, preferably about eight to twelve seconds. The closing of contact R2a completes a circuit to relay R4 which controls normally open contacts R4a and R4b. It will be noted that contact R4a is in series with contact S5a and switch S9. Therefore, the energizing circuit to solenoid K through switch S9 cannot be completed until R4 is energized. When S5a closes, there is a closed circuit through wafer C at position P1 and resistance 102 to solenoid K, but as has been explained, the current through this circuit is not sufficient to advance the solenoid ratchet.

When contact R4a closes, a circuit is established to solenoid K through switch S9, which now shunts resistor 102, and the step switch will be advanced when cam I closes contact S5a.

When wafer B advances one position, arm B2 makes contact with one of the contacts B1 which are wired together in positions P2 and to P24 and are connected in the circuit of relay R3, thus energizing this relay. This relay controls normally open contacts R3a and R3b which are connected in parallel with contacts R4a and R4b. The circuit to relay R1 is simultaneously broken. This relay has a normally closed contact R1b which now takes over the circuits to the motor M and lights 60, 61. The circuit to relay R2 is also broken, and after a delay its heater cools and allows contact R2a to open. Relay R4 is also deenergized.

Relay R3 remains energized for the remainder of the cycle of the step switch until the switch returns to the start position. A current pulse will therefore be transmitted to solenoid K by way of contact R3a every time cam 1 closes contact S5a. On wafer C, the group of contacts C1 from P1 to P6, from P13 to P18, and P23 and P24 are all wired to resistor 102. The group at P7, P8, P9, and P19, P20, P21 are also wired to the resistor through a normally closed switch S8, the function of which will be explained later. When arm C2 is engaged with any of the above groups of contacts, resistor 102 is in the solenoid circuit, and the step switch will be advanced one step and held. When arm C2 is engaged with an open contact C1, resistor 102 is cut out of the circuit, and the step switch will skip rapidly from one position to the next because of the operation of switch S9, as previously explained. As wafer C is wired in this illustration, the step switch will advance one step for each revolution of cam I (that is, each closing and opening of contact S5a) in positions P1 to P9, will skip through P10, P11 and P12 to P13, advance one step at a time from P13 to P21 and skip P22.

At position P23 it is desirable to intorduce a time delay or holding period in the movement of the step switch 45 for a purpose which will be described later. A thermal DC time delay relay R11 is energized from bridge 101 through the arm F2 and the contact F1 at position P23. A circuit is also established to a DC relay R12 through a normally closed contact R11a of R11. R12 controls a normally closed contact R12a which is in the circuit to solenoid K between contact R3a and switch S9. When R12 is energized, the circuit to solenoid K through switch S9 is broken, and the closing of contacts S5a will not advance the solenoid. Contact R12a remains open at position P23 during the delay period established by relay R11. During this period the coin changer which drops the coin into the "Pass" or "Fail" compartment of drawer 15 operates and switch S2 is opened, as will be later described. When contacts R11a open, relay R12 is deenergized and the circuit to switch S9 restored. The step switch then moves to position P23 at which point relay R11 is also deenergized, and lamps 60, 61 are extinguished because the P24 contact of wafer A is open. The next closing of contacts S5a moves the step switch back to the start position P1, restoring all the circuits to starting condition.

Test procedure

The disk on which the symbols are printed, as shown in FIG. 7, has twenty-four positions which will be referred to its P1 through P24, corresponding to the twenty-four positions of the step switch 45. As illustrated in FIG. 9, the disk 47 is mounted on the shaft of switch 45 at 90° counter-clockwise with respect to the wafers A through F, so that the symbols in the P1 position of the disk are in line with windows 30, 33 and lens 12 in the start position of the step switch, and are thus visible to the subject's left eye. The disk has nine pairs of symbols 105 in positions P1 through P9, here shown as consisting of the letter E disposed in various positions. The two letters in each of positions P1, P2, P4, P6, and P9 are disposed in the same direction, and in positions P3, P5, P7 and P8, the letters are disposed in different directions.

When the machine is set into operation by dropping a coin into slot 14, the disk is illuminated; after the initial delay period, the step switch moves one step for each revolution of cam I through the first nine positions, as previously explained. The symbols in these positions on the disk are thus presented in succession to the subject's left eye. The steps P10, P11, and P12 are skipped. When the step switch arrives at P13, the symbols at P1 on the disk are aligned with lens 11 and are visible to the subject's right eye. The step switch moves step by step through position P13 to P21, presenting the nine pairs of symbols in succession to the right eye. Position P22 is skipped and the step switch then dwells at P23 for a certain delay period, as has been explained. At this position a symbol 106, consisting of a red dot, is presented to the subject's left eye, and a symbol 107, consisting of a clock face, is presented to the right eye. The step switch finally moves to position P24, where the disk appears blank to both eyes, and the lamps go out. The switch then moves back to start position and the test is finished.

Before the test, the subject is instructed to press button 13 if the symbols in a pair appears the same, and not to press the button if the symbols appear different, or if he cannot see them clearly. He is also instructed to press the button when the red dot and clock face appear, if the dot appears to be on the clock face, but not to press if the button appears off the clock face. This is a test for muscle balance.

At position P6, and its complementary position P18, solenoids 24 and 25 are energized, as will be explained, to bring lenses 16 and 17 into the subject's line of vision. The lenses are bi-convex lenses of the type ordinarily used as a test for latent hypermetropia or far-sightedness. These lenses will blur the vision of a subject having normal vision so that he cannot see the symbols clearly, but a person having the above defect is able to see the symbols through lenses 16 and 17. The correct response, that is the response which a subject of normal vision would make, is not to press button 13, even though the symbols at P6 are in fact alike, because he cannot see them clearly. If the subject does not press the button, lenses 16 and 17 will drop out in the next position. If he does, the lenses remain in through positions P7 and P8 (or corresponding positions for the right eye P19 and P20), and provide a further test for hypermetropia. If the condition is marginal, the subject may press the button 13 again because the symbols appear alike to him in position 7 or 8, although they are, in fact, unlike. In that case he does not fail the test, as a whole, as will be explained in connection with the scoring circuit.

If the subject's responses are all correct, the coil R9 of the coin changing device shown in FIG. 8 is energized in such a direction as to drop the coin into the "Pass" compartment of drawer 15 at the end of the test. If the subject's response is incorrect in any portion of the test for either eye, R9 is energized so as to drop the coin into the "Fail" compartment.

Scoring circuit

The circuit which energizes coil R9, at the end of the test run, to drop the coin into the "Pass" or "Fail" compartment, is illustrated in FIG. 10. R9 is energized by a circuit controlled by contacts of a relay R7. This relay has normally open contacts R7a, R7c, R7e and R7g, and normally closed contacts R7b, R7d, and R7f. The upper end R9a is connected to contacts R7d and R7e, and the lower end R9b is connected to contacts R7c and R7f. If R7 is deenergized when the step switch arrives at position 23, end R9a of coil R9 will be connected through contact R7d, a normally closed contact R12b of relay R12, and wafer F, to the positive junction 101d of bridge 101, and end R9b will be connected through contact R7f to the ground junction 101c of the bridge. If R7 is energized, the connections of R9 to the bridge junctions will be reversed, as R7c and R7e will be closed. The direction in which current flows through R9, therefore, depends on whether R7 is energized or de-energized when the step switch reaches position P23. If R7 is energized, the coin changer will be operated in such a direction as to drop the coin into the "Fail" compartment of drawer 15.

At the beginning of the test run R7 is de-energized as the circuit to its coil passes through normally open contacts R3b and R4b of relays R3, R4 which are not energized at that point. R9 is likewise de-energized and remains so until wafer F reaches position P23.

The button 13 operates a pulse switch S3 of the type which closes momentarily when the button is pushed in, then reopens and cannot be closed again until the button is released and pushed in once more. Switch S3 is connected between the grid 108a and cathode 108b of a thyratron 108. The thyratron is connected in a circuit including a grid bias network of conventional type consisting of resistance 109, condenser 110 and rectifier 111 which normally maintains the grid negative. If switch S3 is closed the grid is brought to cathode potential and the tube will fire and continue to conduct until its plate voltage is cut off. The plate of the thyratron is connected to a relay R5, which, in position P1, is connected through wafer F to the positive junction 101d. Therefore, if switch S3 is closed while step switch 45 is in the start position, the thyratron will conduct and energize relay R5 which will remain energized until the step switch advances.

A relay R6 becomes energized in position P1 by a circuit passing through wafer D and contact S5b which is closed except at one point in the revolution of cam I. This relay controls a normally closed contact R6a and a normally open contact R6b. Relay R6 will remain energized until the step switch moves to position P2.

The circuit to relay R7 includes a normally closed contact R8a of a relay R8 which is energized only in certain positions of wafer E for a purpose which will be explained later, and a normally closed contact R5a of relay R5. The circuit passes from there to normally open contacts R3b of relay 3, and R4b of relay R4 and thence to normally open contact S4a operated by cam II. As explained in the description of the step switch drive circuit, relay R4 is not energized in position P1 until the end of a delay period determined by a thermal delay relay R2, allowing the timer motor to make several revolutions in position P1. Relay R3 is not energized until the step switch moves to position P2. Therefore, both contacts R3b and R4b are open. When relay R4 closes, the next closing of contact S5a will advance the step switch to position P2. Shortly before this occurs, S4a is closed by cam II. If the subject has not pressed button 13 by this time, relay R5 is not energized and relay R7 will become energized through contact R5a, contact R4b being now closed. If the subject has pressed button 13 during any prior revolution of the cams, relay R5 is energized and contact R5a will be open when R4b closes, so that no circuit is established to relay R7.

It will be noted that relay R7, once it is energized, establishes a holding circuit through its own contact R7g directly to bridge 101. Therefore, this relay, if energized in the start or any subsequent position of the step switch, will remain energized until the end of the test cycle, and cause coil R9 to be energized in position P23 in such a direction as to drop the coin into the "Fail" compartment.

As the step switch moves to position P2, relay R6 is briefly de-energized by the loss of the connection through wafer D and momentary opening of contact S5b, but becomes energized again through wafer D when contact S5b closes. It will be noted that certain contacts D1 of wafer D, corresponding to positions on disk 47 in which like symbols are viewed, are connected together by a wire 112. Certain other D1 contacts, corresponding to position of unlike symbols, are connected together by a wire 113. Relay R5 is also de-energized and the thyratron cut off by the loss of the connection through wafer F, but its circuit to the positive side of bridge 101 is re-established when contact R6b closes. Relay R3 is energized and contact R3b is closed. The step switch dwells in this position for only one revolution of the cams. In position P2 the symbols viewed are alike and the subject should press button 13, thus energizing relay R5 again and opening contact R5a. If he does not, an energizing circuit will be established to relay R7 through contacts R5a and R3b when S4a closes near the end of the dwell period. When contact S5b opens relay R5, if it has been energized, becomes de-energized again and the thyratron is cut off. Simultaneously contact S5a is closed and the step switch advances to position P3.

In position P3, the symbols viewed are unlike and the correct response is not to press button 13. In this position the circuit of relay R6 is open at wafer D so that this relay is de-energized. Relay R5 is connected directly to wafer D through wire 113, and receives voltage through contact S5b because arm D2 is now engaged with one of the contacts to which wire 113 is connected. If the button 13 is not pressed, no current will flow to R7 when S4a closes because the circuit between S4a and S5b is open at wafer D. If the subject pushes the button, R5 will be energized, and its normally open contact R5b will be closed. This establishes a circuit to R7 through normally closed contact R6a. R5b is connected to S5b, which is closed during the dwell period of the step switch, and R7 will thus be energized as soon as button 13 is pushed. At the end of the cam revolution, R5, if energized, is de-energized by the opening of S5b and the step switch is advanced one position, as before.

At position P4, in which the viewed symbols are alike, the connections through wafer D to R6 and R3b are the same as in position P2, and the device operates as described with respect to that position. In position P5 the symbols viewed are unlike, and the wafer D connections and operations are the same as in position P3.

At position P6, a group of contacts E1 of wafer E, which are connected to wire 114, are engaged by arm E2. A circuit is established to relay R8 which becomes energized, opening contact R8a and closing contact R8b. At the same time a circuit is completed through solenoids 24 and 25 which bring lenses 16 and 17 into the line of view, by way of a normally closed contact R10b of a relay R10. If R7 has previously been energized as the result of an incorrect response, relay R10 will also have been energized, through contacts R7a and R7g, and contacts R10b will be open. Therefore, solenoids 24, 25 will be energized only if the subject has passed the test up to this point, and relay R10 has not become energized.

As previously explained, the symbols at position P6 are actually alike, but a subject with normal vision cannot see them because of the blurring effect of lenses 16, 17. Therefore, the correct response is not to press button 13. If the button is not pressed, relay R10 will be energized when S4a closes, through wafer D and contacts R5a, R8b. The connections of wafer D in this position are the same as in position P2 or any other "like" position and R6 is energized. Therefore, if the subject presses the button, indicating he can see the symbols, R5 will be energized, breaking the circuit to R10 at R5a.

In positions P7 and P8 the symbols are unlike, and the connections of wafer D are the same as in P3. Relay R6 is de-energized. If relay R10 is energized at position P6, the solenoids 24, 25 drop out because contact R10b opens, and lenses 16 and 17 are removed from the line of vision. A subject with normal vision will not press the button in either of these positions. Current cannot be transmitted to R7 in any case in these two positions because R8 remains energized and R8a is open. These positions are, in effect, dummies if the correct response has been given, that is, button 13 has not been pushed in position P6.

If the subject has pressed the button 13 in P6, the lenses 16, 17 remain in. To a subject having latent hypermetropia the symbols will be visible in positions P7 and P8. Therefore, R10 will not be in an energized condition when the step switch arrives at position P9. A subject with a marginal defect may see the symbols incorrectly in position P7 or P8, and press the button 13, causing R10 to be energized through R5b and R6a which is now closed.

When the step switch moves into position P9, arm F2 of wafer F engages one of the contacts F1 which is connected to a normally closed contact R10c of R10. If R10 has not been energized in positions P6, P7, P8, contact R10c is closed and R7 will be energized. However, if R10 has been energized at any of the three previous positions it will remain energized, through its holding circuit, in position P9 and contact R10c will be open. R7 will then not be energized.

As previously explained with respect to the step switch drive circuit, positions P10, P11, P12 are skipped through rapidly because resistor 102 is not connected in the circuit of solenoid K.

At position P13, the condition of the scoring circuit is in position P1, except that contact R3b is closed. The pair of symbols 105 at position P1 on disk 47 is now viewed by the subject's right eye. The test proceeds through positions P13 to P21 for the right and the operation of the circuit is the same as in positions P1 through P9. Position P22 is skipped.

When the step switch arrives at position P23, a delay is introduced in its movement by the operation of relays R11, R12, as has been described. R12b is open. In this position the symbols 106, 107 for the muscle balance test are viewed. The wafer D connections are the same as those for one of the positions of like symbols. Therefore R6 is energized. The correct response in this position is to press button 13. If this is done before S4a is closed in the first revolution of the cams in this position, R5a will open, and no current will flow to R7 (assuming that the subject has responded correctly in the previous positions and R7 is not already energized). As soon as R12b closes, a circuit will be established to coil R9 in such a direction as to operate the coin changer to drop the coin into the "Pass" compartment of drawer 15.

If R7 is already energized when position P23 is reached, or becomes energized because the subject fails to press the button in time in that position, the closing of contact R12b causes R9 to be energized in a direction to drop the coin into the "Fail" compartment. Upon operation of the coin changer, coin switch S2 is opened.

When the step switch moves to position P24, the viewing lamps 60, 61 go out. The next movement of the step switch brings it back to the starting position ready for another test cycle.

Semi-automatic operation

In some cases it may be desirable for a supervisor to give a test. The coin switch S2 may be closed manually, and the test cycle starts as in fully automatic operation. The subject in this case is asked to state whether the symbols appear the same or different. A manual switch S6 is connected in series with the timer motor M. The supervisor can hold the step switch in any position by opening S6, to give the subject more viewing time if desired. On arriving at position P6, where lenses 16, 17 come in, if the subject reports that the images appear blurred, indicating that his vision is normal, the supervisor may skip through positions P7, P8 and P9 by opening manual switch S8, thus disconnecting resistor 102 at these positions. The same is true in positions P19, P20 and P21.

So that the supervisor may know what symbols are being viewed by the subject, indicator lamps L3, L4, and L5 are provided. L5 is connected to wire 112 on wafer D, and is thus lighted when the step switch is in any position where the symbols viewed are alike. L4 is connected to wire 114 on wafer E and is thus lighted when lenses 16, 17 are brought in. L3 is connected to an F1 contact of wafer F at position P23, and thus is lighted when the muscle balance test symbols 106, 107 are being viewed.

The arrangement of symbols as here illustrated on disk 47 has a particular advantage, as it leaves one half of the disk blank. Except when the muscle balance test symbols 106, 107 appear, an illuminated blank space is presented to one eye when a set of symbols is presented to the other. It is unnecessary to mask the eye being tested, and consequently the subject is not required to adjust to different light levels during the test.

If some other arrangement of symbols is used on the test disk, it may be necessary to bring in the masks 35, 36 at various times. This may be accomplished as shown by way of example in FIG. 11. An additional wafer contactor G has one half of its contacts wired to solenoid 42 and the other half to solenoid 41. During the first half of the cycle, solenoid 42 will be energized to bring mask 36 in front of the right eye, and during the second half solenoid 41 will be energized to bring mask 35 in front of the right eye.

Another feature which contributes to the reliability of the machine is that it makes no difference how quickly or how long the subject pushes the button 13 because the switch S3 delivers only a brief pulse, and the duration of the period for which relay R5 is energized is determined by the timing cam I which controls the thyratron plate circuit. If a subject should accidentally continue to hold the button in while the step switch is changing to a new position, this will not cause an error in his response to the new set of symbols, because the thyratron is automatically cut off, and he must release the button and press it again in order to re-energize relay R5.

One program of symbols is here described by way of illustration. The sequence of like and unlike symbols on the disk may be changed, and the machine can be readily adapted for a new sequence by making appropriate changes in the wiring of like and unlike positions on wafer D which determines the condition of the electrical system for registering the push button response as correct or incorrect.

What is claimed is:

1. A vision testing device, for use by a person undergoing vision test, comprising
    means for displaying to said person an unpredictable series of symbol exhibits in succession,
        each symbol exhibit having one of two different orientations to each eye to which it is presented,
    indicating means selectively operable by said person for indicating for each of said symbol exhibits so displayed which of said orientations it appears to him to assume,
    two-position scoring means for ultimately showing satisfactory or unsatisfactory operation of said indicating means by said person,
    means responsive to operation of said indicating means for selectively registering on said scoring means the correctness of each of the selective operations of said indicating means as compared with the actual orientation of each of the series of symbol exhibits, the cumulative ultimate registering resulting in the selected position of said scoring means.

2. A device as described in claim 1, wherein each of said symbol exhibits is a pair of identical symbols, one orientation being a similar positioning of each of said pair and the other orientation of said identical symbols being a dissimilar positioning of each of said pair.

3. A device as described in claim 1, having
    means providing a restricted field of vision for said person, and
    a second indicating means disposed outside said field and adapted to indicate to a second person which orientation of said two orientations is being assumed by the symbol exhibit being displayed.

4. A vision testing device, adapted for use by a person undergoing a vision test, comprising
    a viewing system including a first and second eye piece and adapted to restrict the fields of vision through said eye pieces, respectively, to a first and second separate predetermined area,
    a rotatable display disk centrally mounted with respect to said areas and having a circumferential portion passing through both of said areas, said disk having a series of symbol exhibits disposed in spaced relationship in said portion around not more than half the circumference of the disk, each symbol exhibit having one of two different orientations,
    means for rotating said disk in step-by-step positions to display said symbol exhibits in succession so that some of said symbol exhibits are displayed in said first area and some of said symbol exhibits are displayed in said second area,
    indicating means selectively operable by said person for indicating for each of said symbol exhibits so displayed which of said orientations it appears to him to assume,
    two-position scoring means for ultimately showing satisfactory or unsatisfactory operation of said indicating means by said person, and
    means responsive to operation of said indicating means for selectively registering on said scoring means the correctness of each of the selected operations of said indicating means as compared with the actual orientation of each of the series of symbol exhibits, the cumulative ultimate registering resulting in the selected position of the scoring means.

5. A device as described in claim 4, said disk having
    a first symbol exhibit and a second symbol exhibit disposed in spaced relationship in said portion such that they are displayable simultaneously, said first symbol exhibit being displayed in said first area and said second symbol exhibit being displayed in said second area, and
    said indicating means being operable by said person for indicating whether said first and second symbol exhibits appear superimposed when they appear in said areas.

6. A device as described in claim 4, having
    a first and second bi-convex lens, and
    means for moving each of said lenses into register one with each of said eye pieces, coinciding with selecetd rotational positions of said disk, said lenses causing a vision distortion of said person and affording a test for hypermetropia by affecting said person's determination of symbol exhibit orientation appearance.

7. A vision testing device as described in claim 4, having
    a first shutter and a second shutter, and
    means for moving each of said shutters into register, one with each of said eye pieces, coinciding with selected rotational positions of said disk, said first shutter covering said first predetermined area while permitting the entrance of ambient light to said first eye piece and said second shutter covering said second predetermined area while permitting the entrance of ambient light to said second eye piece.

8. A vision testing device, adapted for use by a person undergoing vision test, comprising
    a viewing system adapted to restrict said person's field of vision to a predetermined area,
    a rotatable display disk having a circumferential portion passing through said area and a series of symbol exhibits disposed in said portion, each symbol exhibit having one of two different orientations,
    an electric drive device adapted to rotate said disk in step-by-step positions to display said symbol exhibits in succession in said area, said drive device having a start position and being adapted to dwell in each of said rotational positions for a predetermined dwell period,
    a regulating circuit adapted to initiate operation of said drive device and including an electronic time delay circuit adapted to delay movement of said drive device from said starting position for a time longer than said dwell period,
    indicating means selectively operable by said person for indicating for each of said symbol exhibits so displayed which of said orientations it appears to him to assume,
    two-position scoring means for ultimately showing satisfactory or unsatisfactory operation of said indicating means by said person, and means responsive to operation of said indicating means for selectively registering on said scoring means the correctness of each of the selected operations of said indicating means as compared with the actual orientation of each of the series of symbol exhibits, the cumulative ultimate registering resulting in the selected position of the scoring means.

9. A vision testing device, adapted for use by a person undergoing vision test, comprising a viewing system adapted to restrict said person's line of vision to a predetermined area, a rotatable display disk having a circumferential portion passing through said area and a series of symbol exhibits disposed in said portion, each symbol exhibit having one of two different orientations, an electric drive device adapted to rotate said disc in step-by-step positions to display said symbol exhibits in succession in said area, a regulating circuit for actuating said drive device to dwell for a predetermined period in each of certain selected positions and to slip rapidly through each of other selected positions, indicating means selectively operable by said person for indicating for each of said symbol exhibits so displayed which of said orientations it appears to him to assume, two-position scoring means for ultimately showing satisfactory or unsatisfactory operation of said indicating means by said person, and means responsive to operation of said indicating means for selectively registering on said scoring means the correctness of each of the selected operations of said indicating means as compared with the actual orientation of each of the series of symbol exhibits, the cumulative ultimate registering resulting in the selected position of the scoring means.

10. A vision testing device as described in claim 9, wherein said regulating circuit includes an energizing source having a substantially fixed output voltage value, solenoid switching and ratchet means for stepping said disk a predetermined incremental amount to each position and including a resistance path to the coil thereof to allow sufficient current from said source to be applied to said coil to hold said disk in a set position, and a motor driven cam switch for shorting said resistance path and connecting sufficient current from said source to said solenoid switching and ratchet means to cause said stepping of said disk upon cam switch operation.

11. A vision testing device, for use by a person undergoing vision test, comprising a display device bearing a series of symbol exhibits, each symbol exhibit having one of two different orientations, drive means for driving said display device to display each of said symbol exhibits in succession to said person, an indicating means selectively operable by said person for indicating for each of said symbol exhibits so displayed which of said orientations it appears to him to assume, a registering circuit adapted to register selectively a correct and an incorrect response, a control circuit for said registering circuit, said control circuit being adapted to energize said registering circuit to register a correct response, upon operation of said indicating means when the symbol exhibit displayed has the first orientation, and upon non-operation of said indicating means when the symbol exhibit displayed has the second orientation, and two-position scoring means connected to said register circuit for ultimately showing satisfactory overall operation of said indicating means by said person.

12. A vision testing device as described in claim 11, wherein said scoring means includes a housing with an opening for receiving a token and a receptacle with two compartments, a register device connected to receive a polarity current from said register circuit upon completion of the vision test, said registering device having an actuating coil and being adapted to discharge said token inserted into said opening into one of said compartments when said coil receives a current of one polarity and into the other of said compartments when said coil receives a current of opposite polarity.

13. A vision testing device as described in claim 12, wherein said registering circuit includes a source of D.C. current and relay switching means connected to the terminals of said actuating coil, said relay switching means being energized causing current from said source to pass in one direction through said actuating coil and said relay switching means being de-energized causing current from said source to pass in the opposite direction through said actuating coil.

14. A vision testing device, for use by a person undergoing vision test, comprising a display device bearing a series of symbol exhibits, each symbol exhibit having one of two different orientations, drive means for driving said display device to display each of said symbol exhibits in succession to said person, two-position selective response means for showing correctness or incorrectness of response by said person, including a D.C. source having a positive terminal and a negative terminal, an armature relay switch having a relay coil with a first and second terminal, an armature that closes in a first position when a positive-to-negative potential is applied across said coil from its first to second terminal and closes in a second position when a positive-to-negative potential is applied across said coil from its second to first terminal, relay switching means when deenergized for connecting the positive terminal of said source to said first terminal of said coil and the negative terminal of said source to said second terminal of said coil and when energized for connecting the negative terminal of said source to said first terminal of said coil and the positive terminal of said source to said second terminal of said coil, and means for energizing said switching means selectively operable by said person for indicating for each of said symbol exhibits so displayed which of said orientations it appears to him to assume.

15. A vision testing device as described in claim 14, wherein said energizing means comprises a thyratron having a cathode, a control grid and a plate, a grid control network including a pulse switch connected between said grid and cathode operable by said person, said grid control network being adapted to fire said thyratron upon operation of said pulse switch, a circuit closing means connected to said plate having alternatively selectable paths for each of a plurality of positions corresponding to each of said exhibits, at least one of said paths for allowing the plate voltage from said thyratron to energize said relay switching means, and at least another of said paths being open circuited so as to cut off said thyratron.

(References on following page)

References Cited

UNITED STATES PATENTS

| | | | |
|---|---|---|---|
| 276,732 | 5/1883 | Trowbridge | 351—26 |
| 2,225,846 | 12/1940 | Russell | 351—28 |
| 2,468,953 | 5/1949 | Bennett et al. | 351—17 |
| 3,012,472 | 12/1961 | Feinberg et al. | 351—36 |
| 3,205,505 | 9/1965 | Fletcher et al. | 351—32 |

FOREIGN PATENTS 56,477  8/1890  Germany.

DAVID SCHONBERG, Primary Examiner

T. H. KUSMER, Assistant Examiner

U.S. Cl. X.R.

351—18, 26, 36, 39